(12) United States Patent
Nobata et al.

(10) Patent No.: US 11,414,312 B2
(45) Date of Patent: Aug. 16, 2022

(54) LOAD HANDLING DEVICE

(71) Applicant: KABUSHIKI KAISHA TOYOTA JIDOSHOKKI, Kariya (JP)

(72) Inventors: Shigehiro Nobata, Aichi-ken (JP); Takahiro Yabuuchi, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 0 days.

(21) Appl. No.: 17/317,284

(22) Filed: May 11, 2021

(65) Prior Publication Data

US 2021/0354964 A1 Nov. 18, 2021

(30) Foreign Application Priority Data

May 15, 2020 (JP) .............................. JP2020-085590

(51) Int. Cl.
*B66F 9/12* (2006.01)
*B66F 9/14* (2006.01)

(52) U.S. Cl.
CPC ................ *B66F 9/122* (2013.01); *B66F 9/14* (2013.01)

(58) Field of Classification Search
CPC .................................. B66F 9/122; B66F 9/14
See application file for complete search history.

(56) References Cited

U.S. PATENT DOCUMENTS

| | | | | |
|---|---|---|---|---|
| 4,007,846 A * | 2/1977 | Pipes | ................... | B65G 1/0435 414/807 |
| 4,812,102 A * | 3/1989 | Smith | ................... | B65G 1/0435 414/280 |
| 4,856,956 A * | 8/1989 | Zur | ....................... | B65G 1/0435 414/280 |
| 5,328,316 A * | 7/1994 | Hoffmann | ............ | B65G 1/0435 187/404 |
| 5,839,872 A * | 11/1998 | Goto | ..................... | B65G 1/0435 414/280 |
| 5,927,926 A * | 7/1999 | Yagi | ..................... | B65G 1/0407 414/280 |
| 10,179,698 B2 * | 1/2019 | Torazawa | ............. | B65G 1/0435 |
| 10,618,732 B2 * | 4/2020 | Iwata | ................... | B65G 1/0435 |

FOREIGN PATENT DOCUMENTS

| | | |
|---|---|---|
| JP | 4-130209 U | 11/1992 |
| JP | 2001-270623 A | 10/2001 |
| JP | 2006-182510 A | 7/2006 |

OTHER PUBLICATIONS

Extended European Search Report dated Oct. 20, 2021 from the European Patent Office in European Application No. 21171947.1.

* cited by examiner

*Primary Examiner* — Jonathan Snelting
(74) *Attorney, Agent, or Firm* — Sughrue Mion, PLLC (57) ABSTRACT

A load handling device that is installed between a supply position and a loading position, and configured to load at the loading position the load that has been fed from the supply position. The load handling device includes a base platform, a lifting unit that is movable up and down relative to the base platform, a pair of forks that is configured to support a bottom surface of the load that has been fed from the supply position, a fork distance adjusting mechanism that is configured to adjust a distance between the pair of forks in accordance with a size of the load, and a fork advancing/retracting mechanism that is configured to cause the pair of forks to advance to or retract from the loading position.

7 Claims, 10 Drawing Sheets

LOAD HANDLING DEVICE

CROSS-REFERENCE TO RELATED APPLICATION

This application claims priority to Japanese Patent Application No. 2020-085590 filed on May 15, 2020, the entire disclosure of which is incorporated herein by reference.

BACKGROUND ART

The present disclosure relates to a load handling device configured to load a load.

Japanese Patent Application Publication No. 2001-270623 discloses a handling device as a conventional technique of a load handling device. The handling device disclosed in the Publication is configured to movably support a table on a base in a front-to-rear direction of the handling device and use the table to position a pallet at a loading position. The handling device has a column that is provided upright on a side of the table, and a saddle is supported on the column and movable up and down. A carrier configured to carry an article is disposed on the saddle, and movable in a left-to-right direction of the handling device. The carrier includes a loading plate, a stopper, and a shifter. The loading plate has the article thereon; the stopper engages with an end surface of the article near the table; and the shifter transfers the article from the loading plate to the pallet. The stopper is retractable from the loading plate, and the shifter is movable relative to the carrier in a direction where the carrier moves.

The Publication discloses the handling device in which replacement of parts is not required when the articles vary in dimension, and loading speed is not required to be changed in accordance with weight of each of the articles. With this configuration, it is possible to easily prepare, particularly, a lifting unit in reduced size and at a reasonable price.

With the handling device disclosed in the Publication, it is possible to load loads of various types and in different dimensions without replacing the parts. However, the shifter includes a pusher in fixed size, causing in some cases a large gap between the loads at the loading position due to different sizes of the loads. Also, when the loads are loaded in a cage cart or a stock cart including at least frames protruded upright on front and rear sides of a main body of the cage cart or the stock cart, a countermeasure against interference between the pusher and each of the frames causes the large gap between the loads. Furthermore, the to pusher advances or retracts, requiring some space. Thus, when space is restricted between a supply position of the loads and the loading position of the loads, the handling device may not be able to be installed.

The present disclosure has been made in view of the above circumstances and is directed to providing a load handling device configured to load loads of various types at a loading position of the loads without having a substantial gap between the loads.

SUMMARY

In accordance with an aspect of the present disclosure, there is provided a load handling device that is installed between a supply position where a load is fed and a loading position where the load is loaded, and configured to load at the loading position the load that has been fed from the supply position. The load handling device includes a base platform, a lifting unit that is movable up and down relative to the base platform, a pair of forks that is disposed on the lifting unit and configured to support a bottom surface of the load that has been fed from the supply position, a fork distance adjusting mechanism that is configured to adjust a distance between the pair of forks in accordance with a size of the load, and a fork advancing/retracting mechanism that is configured to cause the pair of forks to advance to or retract from the loading position.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the embodiments together with the accompanying drawings in which.

DETAILED DESCRIPTION OF THE EMBODIMENTS

A load handling device according to an embodiment of the present disclosure will be described below with reference to the accompanying drawings. The load handling device of the present embodiment corresponds to an example of a load handling device provided on a shipment line of a manufacturing plant.

Figure 1:
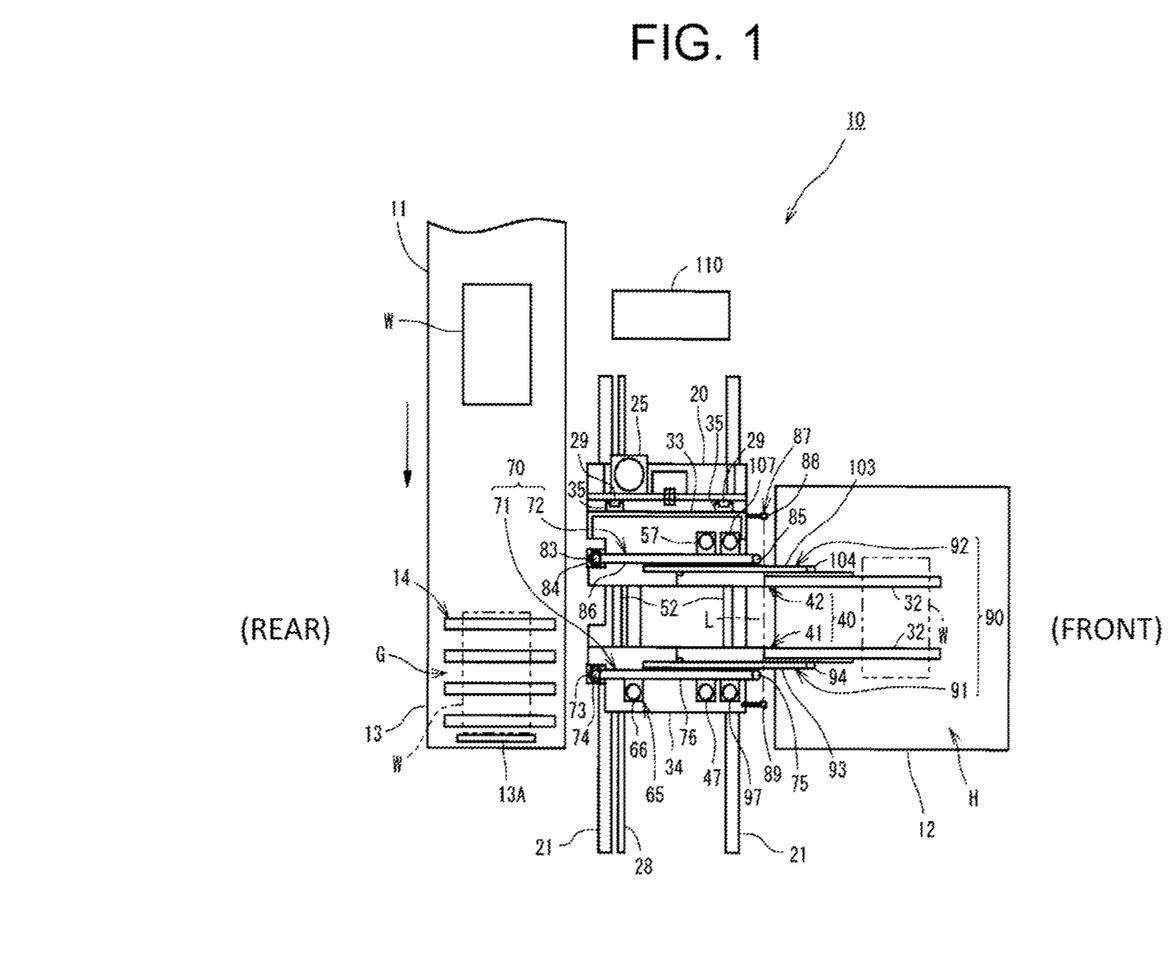
FIG. 1 is a plan view illustrating a schematic configuration of a load handling device according to an embodiment of the present disclosure.

As illustrated in FIG. 1, a load handling device 10 of the present embodiment is installed between a load conveyor 11 and a pallet 12. The load conveyor 11 is a roller conveyor configured to carry a load W toward one direction, and carries the loads W of various types and in different sizes. The load conveyor 11 has an end 13 that corresponds to a supply position G where the load W is fed to the load handling device 10. A feeding mechanism 14 is disposed at the end 13 of the load conveyor 11. The feeding mechanism 14 is configured to feed the load W in a direction intersecting the direction where the load W is carried on the load conveyor 11, A stopper member 13A for positioning the load W is disposed at the end 13 of the load conveyor 11. The stopper member 13A positions a side surface of the load W near the end 13 of the load conveyor 11. The feeding mechanism 14 feeds the load W to the load handling device 10. The load W is a cardboard box, a foldable container box, or the like.

The pallet 12 is formed in a substantially rectangular shape and waits at a loading position H where the load W is loaded from the load handling device 10, The pallet 12 does not move from the loading position H until the load W is completely loaded. When the load W has been loaded on the pallet 12, the pallet 12 is moved from the loading position H by a worker. The pallet 12 is moved in a direction parallel to the direction where the load. W is carried on the load conveyor 11, and orthogonal to the direction where the load W is fed by the feeding mechanism 14. The pallet 12 includes a stopper (not illustrated) that positions the pallet 12.

Figure 2:
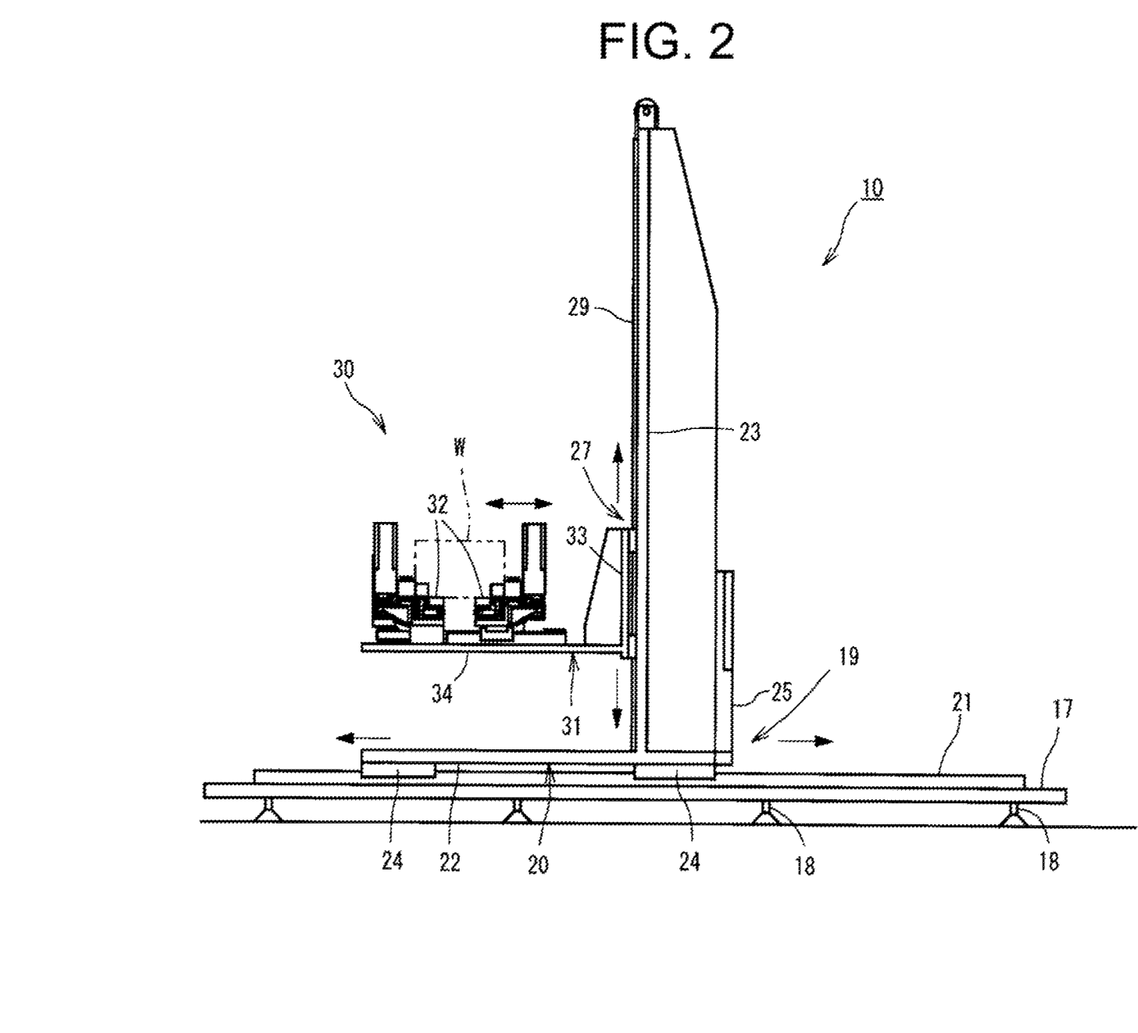
FIG. 2 is a front view of the load handling device according to the embodiment of the present disclosure.

As illustrated in FIG. 2, the load handling device 10 includes a base platform 20. The base platform 20 is supported by a pair of guide rails for reciprocation 21 that is arranged in parallel to the direction where the load W is carried on the load conveyor 11. The base platform 20 reciprocates on the guide rails for the reciprocation 21. The pair of guide rails for the reciprocation 21 is disposed on a base plate member 17 that is supported by legs 18 on a floor. It is noted that, for convenience of description, the base plate member 17 is omitted in FIG. 1. The base platform 20 includes a pedestal 22 of a flat plate shape, and a wall body 23 that is provided upright from the pedestal 22. The pedestal 22 includes, on its rear surface, a base platform-side slider 24 that is guided on the guide rails for the reciprocation 21. The pedestal 22 also includes a drive motor 25 configured to cause the base platform 20 to reciprocate. The drive motor 25 includes an output shaft (not illustrated), and the output shaft has a pinion gear (not illustrated) with which a rack 28 engages. The rack 28 is arranged in parallel to the guide rails for the reciprocation 21. The drive motor 25, the pinion gear, and the rack 28 correspond to a reciprocating mechanism 19 in the present disclosure. It is noted that the reciprocating mechanism 19 may include a belt and a pulley instead of the pinion gear and the rack 28. The wall body 23 includes a pair of lifting guide rails 29, and a lifting unit 30 as will be described next is guided on the pair of lifting guide rails 29.

Figure 3:
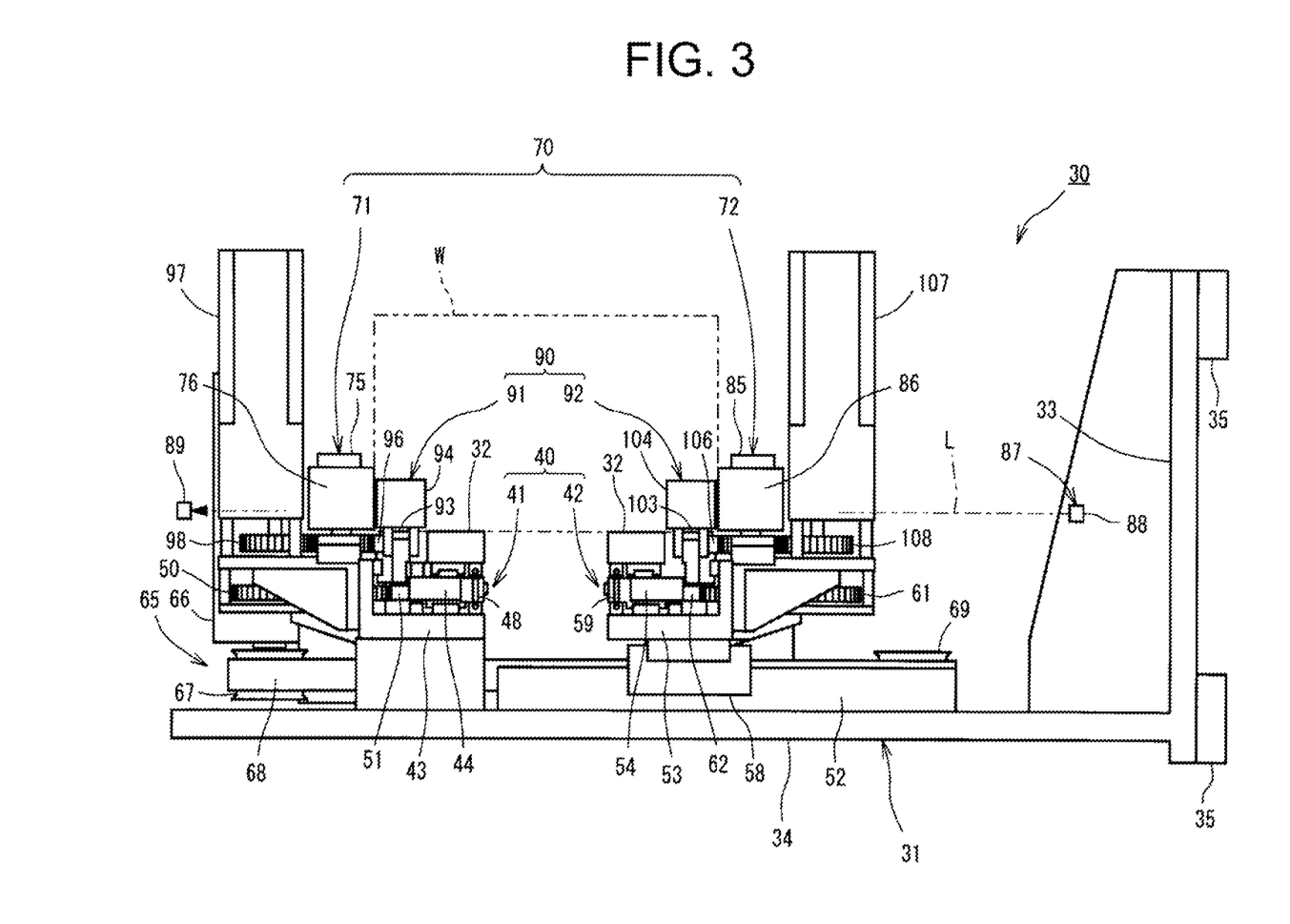
FIG. 3 is a front view illustrating a main part of the load handling device according to the embodiment of the present disclosure.

The load handling device 10 includes the lifting unit 30 that moves up and down relative to the base platform 20. The lifting unit 30 includes a lifting frame 31 and a pair of forks 32. The lifting frame 31 is movable up and down along the wall body 23 of the base platform 20. The pair of forks 32 is disposed on the lifting frame 31 and configured to support the load W that has been fed from the supply position G. As illustrated in FIG. 3, the lifting frame 31 has a vertical portion 33, and a horizontal portion 34 that projects horizontally from a lower portion of the vertical portion 33. A lifting unit-side slider 35 is disposed on a surface opposing the wall body 23 of the vertical portion 33. The lifting unit-side slider 35 is guided on the lifting guide rails 29. The base platform 20 includes a drive motor for moving the lifting unit 30 up and down, a belt, and a pulley (not illustrated), The drive motor causes the lifting unit 30 to move up and down. The lifting unit 30 moves up and down by the driving of the drive motor. The lifting guide rails 29, the lifting unit-side slider 35, the drive motor for moving the lifting unit 30 up and down, the belt, and the pulley cooperate to form a lifting mechanism 27 in the present disclosure.

Figure 4:
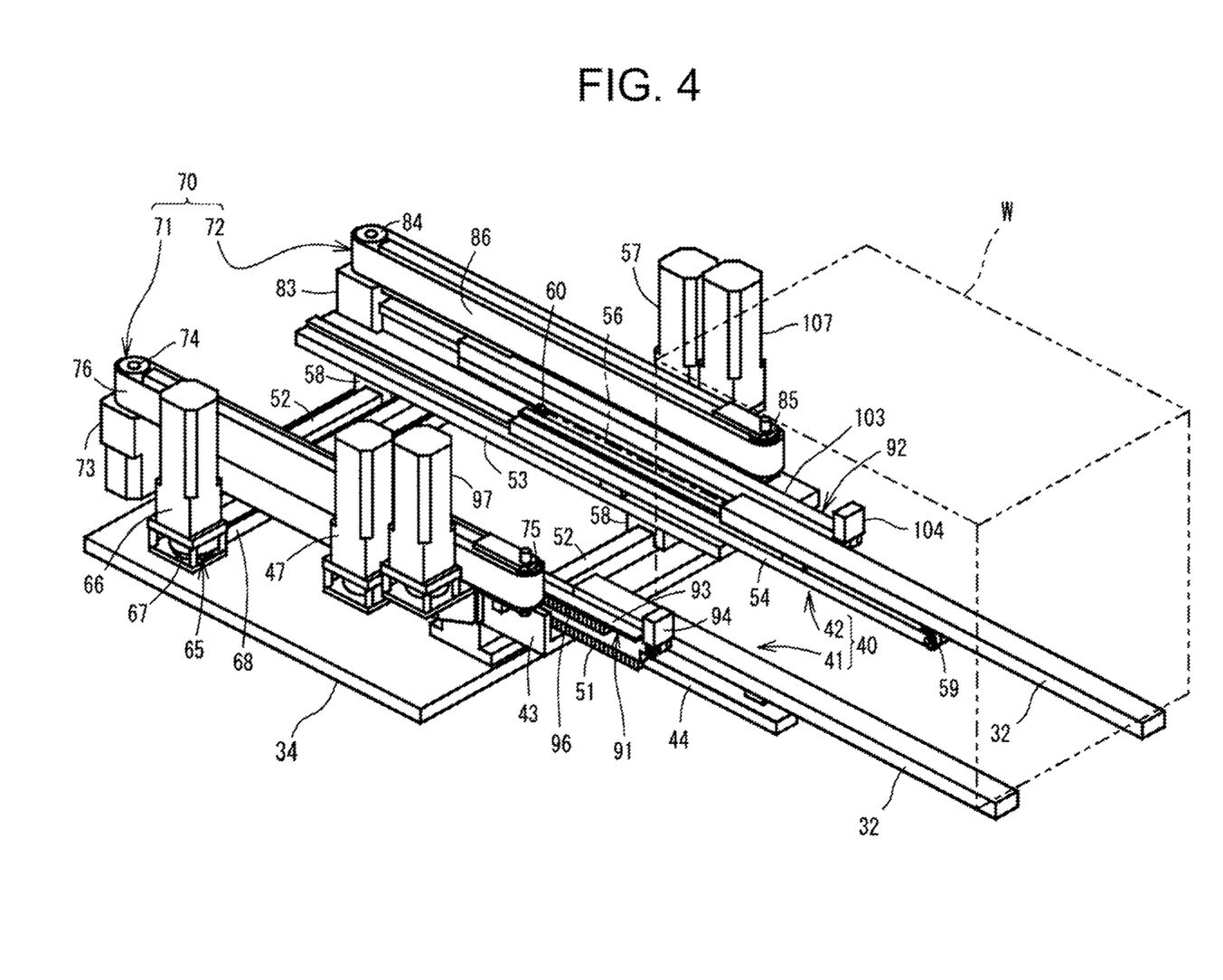
FIG. 4 is a perspective view illustrating a main part of the load handling device according to the embodiment of the present disclosure.

As illustrated in FIGS. 1 and 4, the pair of forks 32 is arranged horizontally to be parallel to each other. A longitudinal direction of the forks 32 is orthogonal to a direction where the base platform 20 reciprocates. Each of the pair of forks 32 is a rectangular prismatic member, and is brought into contact with a bottom surface of the load W to support the load W The pair of forks 32 advances or retracts in a direction orthogonal to the direction where the base platform 20 reciprocates by a fork advancing/retracting mechanism 40 that is disposed on the horizontal portion 34 of the lifting frame 31.

The fork advancing/retracting mechanism 40 has a fork advancing/retracting part 41 and a fork advancing/retracting part 42. The fork advancing/retracting part 41 causes one of the pair of forks 32, which is positioned farther from the vertical portion 33 of the lifting frame 31 relative to the other of the pair of forks 32, to advance or retract. The fork advancing/retracting part 42 causes the other of the pair of forks 32 (hereinafter, referred to the other fork 32), which is positioned closer to the vertical portion 33 relative to the one of the pair of forks 32 (hereinafter, referred to as the one fork 32), to advance or retract.

As illustrated in FIG. 3, the fork advancing/retracting part 41 includes a fixed base member 43, a fork support arm member 44, and a drive motor 47. The fixed base member 43 is L-shaped in a cross section, and the drive motor 47 causes the one fork 32 to advance or retract. The fixed base member 43 is a rectangular prismatic member that supports the fork support arm member 44 in such a manner that the fork support arm member 44 advances or retracts, and is fixed on the horizontal portion 34. A longitudinal direction of the fixed base member 43 is the same as the longitudinal direction of the pair of forks 32. The fork support arm member 44 is a member that supports the one fork 32 in such a manner that the one fork 32 advances or retracts, and a longitudinal direction of the fork support arm member 44 is the same as the longitudinal direction of each of the one fork 32 and the fixed base member 43.

Figure 5A:
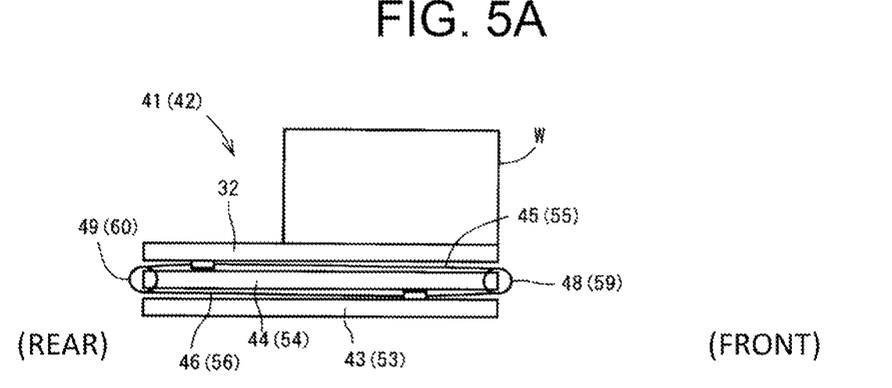
FIG. 5A is a schematic diagram illustrating a state before each of a pair of forks of a fork advancing/retracting mechanism advances in the load handling device according to the embodiment of the present disclosure.
Figure 5B:
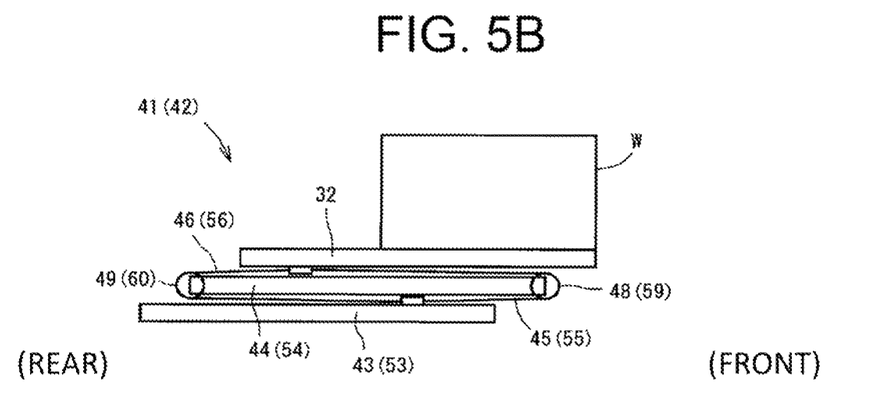
FIG. 5B is a schematic diagram illustrating a state immediately after each of the pair of forks advances.
Figure 5C:
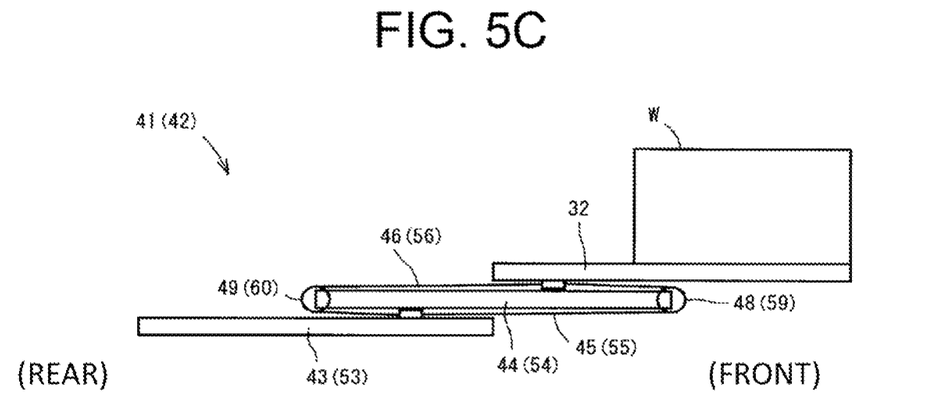
FIG. 5C is a schematic diagram illustrating a state where a load has reached a loading position.

As illustrated in FIGS. 5A, 5B, and 5C, the fork support arm member 44 has, at a front end thereof, a front pulley 48. A rear portion of the one fork 32 and a front portion of the fixed base member 43 are coupled with an advancing belt 45 as an interlock member, and the front pulley 48 changes an orientation of the advancing belt 45. Thus, when the fork support arm member 44 advances toward the loading position H, the one fork 32 advances toward the loading position H relative to the fork support arm member 44. The fork support arm member 44 has, at a rear end thereof, a rear pulley 49. The rear portion of the one fork 32 and the front portion of the fixed base member 43 are coupled with a retracting belt 46 as the interlock member. The rear pulley 49 changes an orientation of the retracting belt 46. Thus, when the fork support arm member 44 that has advanced retracts toward the fixed base member 43, the one fork 32 that has advanced retracts toward the fork support arm member 44.

As described above, the fork support arm member 44 advances or retracts relative to the fixed base member 43; and the one fork 32 is interlocked with the fork support arm member 44 that advances or retracts relative to the fixed base member 43, so as to advance or retract relative to the fork support arm member 44, In other words, the one fork 32 and the fork support arm member 44 cooperate to form a mechanism that extends and contracts in a multi-stage manner.

As illustrated in FIG. 3, the drive motor 47 for causing the one fork 32 to advance or retract includes an output shaft (not illustrated) that is connected to a pinion gear portion 50, A side portion of the fork support arm member 44 extends in the longitudinal direction of the fork support arm member 44, and includes a rack 51 that is connected to the pinion gear portion 50. The pinion gear portion 50 has a plurality of gears such as the pinion gear. When the output shaft of the drive motor 47 for causing the one fork 32 to advance or retract normally rotates, the fork support arm member 44 advances through the pinion gear portion 50 and the rack 51. When the output shaft of the drive motor 47 for causing the one fork 32 to advance or retract reversely rotates, the fork support arm member 44 retracts through the pinion gear portion 50 and the rack 51.

Next, the fork advancing/retracting part 42 will be described. The horizontal portion 34 has a pair of guide rails 52 thereon, and the fork advancing/retracting part 42 is movably supported by the pair of guide rails 52. A longitudinal direction of the guide rails 52 is orthogonal to the longitudinal direction of the pair of forks 32. The fork advancing/retracting part 42 includes a movable base member 53, a fork support arm member 54, and a drive motor 57. The movable base member 53 is L-shaped in a cross section, and the drive motor 57 causes the other fork 32 to advance or retract.

The movable base member 53 is a rectangular prismatic member that supports the fork support arm member 54 in such a manner that the fork support arm member 54 advances or retracts, and includes sliders 58 that slides relative to the guide rails 52. The movable base member 53 is movably supported on the guide rails 52 though the sliders 58. A longitudinal direction of the movable base member 53 is the same as the longitudinal direction of the pair of forks 32. The fork support arm member 54 is a member that supports the other fork 32 to advance or retract, and a longitudinal direction of the fork support arm member 54 is the same as the longitudinal direction of each of the other fork 32 and the movable base member 53.

As illustrated in FIGS. 5A, 5B, and 5C, the fork support arm member 54 has, at a front end thereof, a front pulley 59. A rear portion of the other fork 32 and a front portion of the movable base member 53 are coupled with an advancing belt 55 as an interlock member, and the front pulley 59 changes an orientation of the advancing belt 55. Thus, when the fork support arm member 54 advances toward the loading position H, the other fork 32 advances toward the loading position H relative to the fork support arm member 54 toward the loading position H. The fork support arm member 54 has, at a rear end thereof, a rear pulley 60. The rear portion of the other fork 32 and the front portion of the movable base member 53 are coupled with a retracting belt 56 as the interlock member. The rear pulley 60 changes an orientation of the retracting belt 56. Thus, when the fork support arm member 54 that has advanced retracts toward the movable base member 53, the other fork 32 that has advanced retracts toward the fork support arm member 54.

As described above, the fork advancing/retracting mechanism 40 includes a pair of the fork support arm member 44 and the fork support arm member 54. The fork support arm members 44 and 54 are disposed so as to advance or retract in the direction where the load W is fed, and support the pair of forks 32 in such a manner that the pair of forks 32 advances or retracts. Furthermore, the fork advancing/retracting mechanism 40 includes the advancing belt 45, the advancing belt 55, the retracting belt 46, and the retracting belt 56 as the interlock members. Each of the interlock members is configured to interlock the corresponding fork 32 with the fork support arm member 44 or 54 that advances or retracts, so as to cause the corresponding fork 32 to advance and retract.

As described above, the fork support arm member 54 advances or retracts relative to the movable base member 53; and the other fork 32 is interlocked with the fork support arm member 54 that advances or retracts relative to the movable base member 53, so as to advance or retract relative to the fork support arm member 54. In other words, the other fork 32 and the fork support arm member 54 cooperates to form a mechanism that extends and contracts in a multi-stage manner.

As illustrated in FIG. 3, the drive motor 57 for causing the other fork 32 to advance or retract includes an output shaft (not illustrated) that is connected to a pinion gear portion 61. A side portion of the fork support arm member 54 extends in the longitudinal direction of the fork support arm member 54, and includes a rack 62 that is connected to the pinion gear portion 61. The pinion gear portion 61 includes a plurality of gears such as the pinion gear. When the output shaft of the drive motor 57 for causing the other fork 32 to advance or retract reversely rotates, the fork support arm member 54 advances through the pinion gear portion 61 and the rack 62. When the output shaft of the drive motor 57 for causing the other fork 32 to advance or retract normally rotates, the fork support arm member 54 retracts through the pinion gear portion 61 and the rack 62. It is noted that the drive motor 57 for causing the other fork 32 to advance or retract is driven in synchronization with the drive motor 47 for causing the one fork 32 to advance or retract.

As illustrated in FIGS. 1, 3, and 4, the lifting unit 30 of the present embodiment includes a fork distance adjusting mechanism 65 configured to adjust a distance between the pair of forks 32. As illustrated in FIG. 4, the fork advancing/retracting part 42 of the fork advancing/retracting mechanism 40 is movably supported by the pair of guide rails 52, and thus approaches or moves away to or from the fork advancing/retracting part 41 that is fixed to the lifting frame 31. The fork advancing/retracting part 42 approaches or moves away to or from the fork advancing/retracting part 41, so that the distance between the pair of forks 32 is adjusted.

A drive motor 66 for adjusting the distance between the pair of forks 32 is disposed near the fork advancing/retracting part 41 on the horizontal portion 34 of the lifting frame 31. An output shaft of the drive motor 66 has a belt pulley 67 on which an endless belt 68 is hung. A belt pulley 69 on which the endless belt 68 is hung is disposed on the horizontal portion 34 near the vertical portion 33. The belt pulleys 67 and 69 are arranged in such a manner that a straight line connecting axial centers of the belt pulleys 67 and 69 is in parallel to the longitudinal direction of the pair of guide rails 52. The endless belt 68 is coupled to the movable base member 53.

With this configuration, when the fork advancing/retracting part 42 moves on the guide rails 52 so as to approach the fork advancing/retracting part 41 by the normal rotation of the drive motor 66, the distance between the pair of forks 32 is adjusted to be reduced. In addition, when the fork advancing/retracting part 42 moves on the guide rails 52 so as to be away from the fork advancing/retracting part 41 by the reverse rotation of the drive motor 66, the distance between the pair of forks 32 is adjusted to be increased.

As described above, the fork distance adjusting mechanism 65 of the present embodiment includes the pair of guide rails 52, the sliders 58, the drive motor 66, the belt pulley 67, the belt pulley 69, and the endless belt 68. The fork distance adjusting mechanism 65 adjusts the distance between the pair of forks 32, so that it is possible that the pair of forks 32 supports the loads W of various types and in different sizes.

As illustrated in FIGS. 3 and 4, the lifting unit 30 includes a load drawing mechanism 70. When the load W has been fed from the supply position G onto the pair of forks 32, the load drawing mechanism 70 is configured to draw the load W to a predetermined position. The load drawing mechanism 70 includes a drawing belt part 71 and a drawing belt part 72. The drawing belt part 71 is disposed on the fixed base member 43, and the drawing belt part 72 is disposed on the movable base member 53.

The drawing belt part 71 includes a drive motor 73 for driving a feeder belt, a belt pulley 74, a belt pulley 75, and a feeder belt 76. The drive motor 73 for the feeder belt is disposed at a position that is farther from the vertical portion 33 relative to the one fork 32 and the fork support arm member 44 in a rear portion of the fixed base member 43. An output shaft (not illustrated) of the drive motor 73 is directed upward, and has the belt pulley 74. The belt pulley 75 is loosely rotatable and disposed at a position that is farther from the vertical portion 33 relative to the one fork 32 and the fork support arm member 44 in the front portion of the fixed base member 43. The belt pulleys 74 and 75 are arranged in such a manner that a straight line connecting axial centers of the belt pulleys 74 and 75 is in parallel to the longitudinal direction of the pair of forks 32.

The feeder belt 76 is an endless belt and is hung on each of the belt pulleys 74 and 75. When the drive motor 73 is driven, an area of the feeder belt 76 toward the one fork 32 is fed in a direction where the one fork 32 advances.

The drawing belt part 72 includes a drive motor 83 for driving a feeder belt, a belt pulley 84, a belt pulley 85, and a feeder belt 86. The drive motor 83 for the feeder belt is disposed at a position that is closer to the vertical portion 33 relative to the other fork 32 and the fork support arm member 54 in a rear portion of the movable base member 53. An output shaft (not illustrated) of the drive motor 83 is directed upward, and the output shaft has the belt pulley 84. The belt pulley 85 is loosely rotatable and disposed at a position that is closer to the vertical portion 33 relative to the other fork 32 and the fork support arm member 54 in the front portion of the movable base member 53. The belt pulleys 84 and 85 are arranged in such a manner that a straight line connecting axial centers of the belt pulleys 84 and 85 is in parallel to the longitudinal direction of the pair of forks 32.

The feeder belt 86 is an endless belt and is hung on each of the belt pulleys 84 and 85. When the drive motor 83 is driven, an area of the feeder belt 86 toward the other fork 32 is fed in a direction where the other fork 32 advances. The drawing belt part 72 is disposed on the movable base member 53 supported by the pair of guide rails 52, so that the drawing belt part 72 reciprocates on the pair of guide rails 52 together with the movable base member 53. With this configuration, in the load drawing mechanism 70, the feeder belts 76 and 86 hold the load W therebetween that has been fed from the supply position G to the pair of forks 32 from both sides of the load W. Subsequently, when the drive motors 73 and 83 are driven, the load W advances by the feeder belts 76 and 86 on the pair of forks 32.

As illustrated in FIGS. 1 and 3, a load detector 87 is disposed at an end of the vertical portion 33 of the lifting frame 31 near the loading position H, and configured to detect the load W that has been drawn to the predetermined position. The load detector 87 includes an optical projector 88 configured to project a sensor beam L, and an optical receiver 89 configured to receive the sensor beam L. The optical projector 88 and the optical receiver 89 are arranged with an optical axis of the sensor beam L in parallel to an end of the horizontal portion 34 near the loading position H (a direction perpendicular to the longitudinal direction of the pair of forks 32). When the load W blocks the sensor beam L, a signal indicating a presence of the load W is transmitted. In response to the signal transmitted, the load drawing mechanism 70 stops drawing the load W, so that the load W stops at the predetermined position. The predetermined position corresponds to a position where a front surface of the load W, which has been drawn to stop on the pair of forks 32, is aligned with tips of the pair of forks 32 in a front-to-rear direction of the load handling device 10.

As illustrated in FIGS. 1 and 3, the load handling device 10 includes a load positioning mechanism 90. The load positioning mechanism 90 is configured to restrict the load W from moving back when the pair of forks 32 retracts from the loading position H, and position the load W at the loading position H. The load positioning mechanism 90 includes a load positioning part 91 disposed on the fixed base member 43, and a load positioning part 92 disposed on the movable base member 53.

Figure 6A:
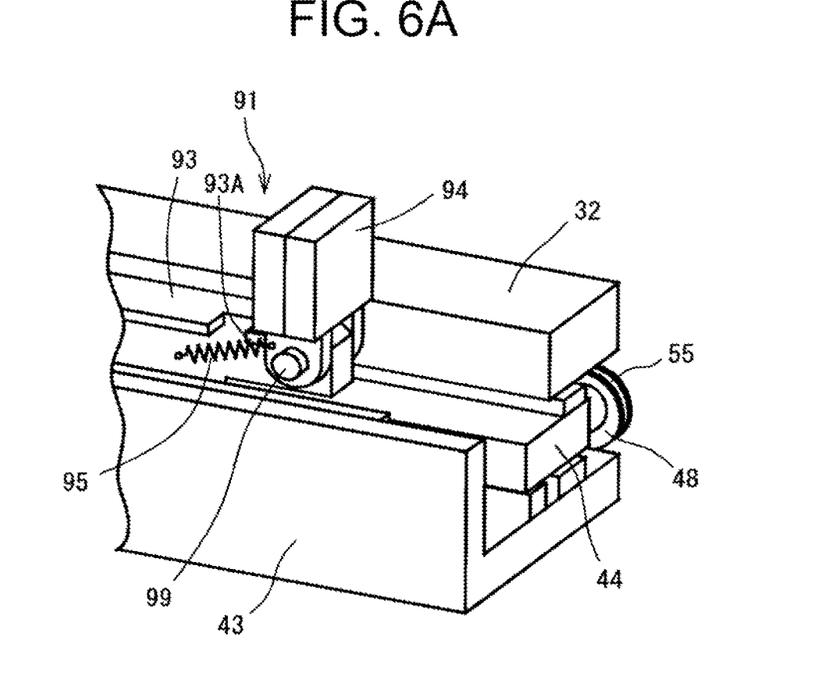
FIG. 6A is a perspective view illustrating a main part of a stopper member standing upright in the load handling device according to the embodiment of the present disclosure.
Figure 6B:
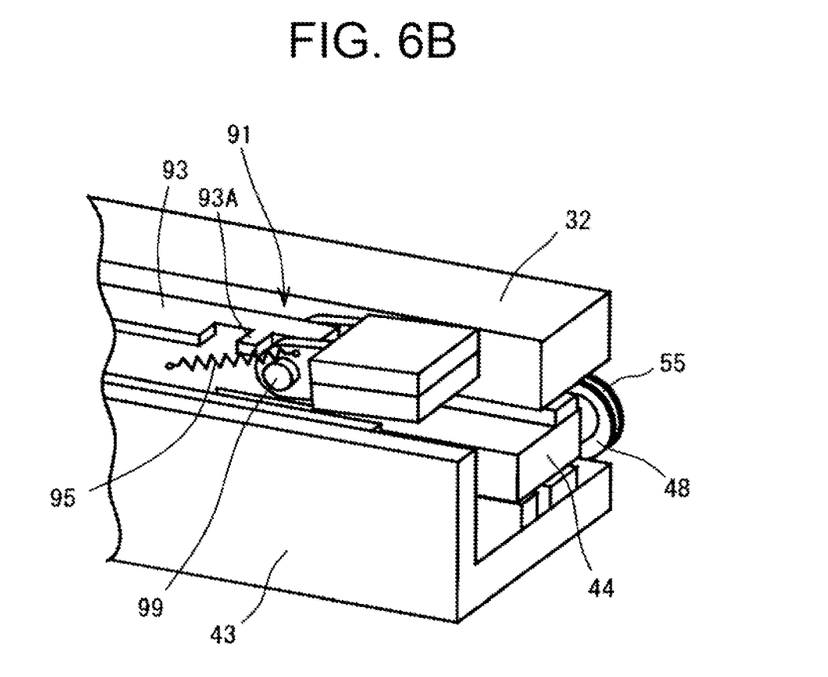
FIG. 6B is a perspective view illustrating the main part of the stopper member lying down.

As illustrated in FIGS. 4 and 6, the load positioning part 91 has a positioning arm member 93, a stopper member 94, and an urging member 95. The stopper member 94 is disposed at a tip of the positioning arm member 93. The positioning arm member 93 is a long member that advances or retracts relative to the fixed base member 43, and is located between the one fork 32 and the feeder belt 76 in a plan view. The positioning arm member 93 has an upper surface set slightly lower than an upper surface of the one fork 32. The positioning arm member 93 has, on a side portion thereof, a rack 96 extending in a longitudinal direction of the positioning arm member 93.

As illustrated in FIG. 3, a drive motor 97 is disposed at the front portion of the fixed base member 43. The drive motor 97 is configured to cause the positioning arm member 93 to advance or retract. As illustrated in FIG. 4, an output shaft (not illustrated) is directed downward, and connected to a pinion gear portion 98 that is connected to the rack 96. The pinion gear portion 98 includes a plurality of gears such as the pinion gear. When the output shaft of the drive motor 97 normally rotates, the positioning arm member 93 advances toward the loading position H through the pinion gear portion 98 and the rack 96. When the output shaft of the drive motor 97 reversely rotates, the positioning arm member 93 retracts from the loading position H toward the horizontal portion 34 through the pinion gear portion 98 and the rack 96.

As illustrated in FIGS. 6A and 6B, the stopper member 94 is a square plate member that stands up or lies down at a tip portion of the positioning arm member 93. The stopper member 94 is coupled to the tip portion of the positioning arm member 93 with a pin 99 so as to stand up or lie down. An axis of the pin 99 is orthogonal to the longitudinal direction of the positioning arm member 93. The stopper member 94 is located next to the one fork 32 so as to come into contact with the load W whenever the one fork 32 supporting the load W advances. The stopper member 94 is inclined forward to lie down and rearward to stand up. When the stopper member 94 lies down, an upper end of the stopper member 94 is at the same level as the upper surface of the positioning arm member 93. When the stopper member 94 stands upright, the stopper member 94 is provided upright at the tip portion of the positioning arm member 93. As illustrated in FIGS. 6A and 6B, when standing upright, the stopper member 94 is in contact with a restricting portion 93A disposed on the positioning arm member 93, so that it is impossible that the stopper member 94 is inclined rearward to lie down.

The urging member 95 is a member that applies urging force to the stopper member 94 such that the stopper member 94 stands up. In this embodiment, the stopper member 94 employs a tensile coil spring. Thus, the stopper member 94 stands up at normal times by the urging force applied by the urging member 95. Furthermore, the stopper member 94 is inclined forward to lie down. This means that when the load drawing mechanism 70 draws the load W on the pair of forks 32, the stopper member 94 lies down. Thus, the stopper member 94 does not hinder the drawing of the load W. When the load W moves toward the loading position H, the stopper member 94 is inclined to lie down by the load W running onto and getting across the stopper member 94. After the load W has passed across the stopper member 94, the stopper member 94 stands upright by the urging force applied by the urging member 95.

As illustrated in FIG. 4, the load positioning part 92 has a positioning arm member 103, a stopper member 104, and an urging member 105 (not illustrated). The stopper member 104 is disposed at a tip of the positioning arm member 103. The positioning arm member 103 is a long member that advances or retracts relative to the movable base member 53, and is located between the other fork 32 and the feeder belt 86 in a plan view. The positioning arm member 103 has an upper surface set slightly lower than an upper surface of the other fork 32. The positioning arm member 103 has, on a side portion thereof, a rack 106 extending in a longitudinal direction of the positioning arm member 103.

A drive motor 107 is disposed at the front portion of the movable base member 53. The drive motor 107 is configured to cause the positioning arm member 103 to advance or retract. An output shaft (not illustrated) of the drive motor 107 is directed downward, and connected to a pinion gear portion 108 that is connected to the rack 106. The pinion gear portion 108 includes a plurality of gears such as the pinion gear. When the output shaft of the drive motor 107 reversely rotates, the positioning arm member 103 advances toward the loading position H through the pinion gear portion 108 and the rack 106. When the output shaft of the drive motor 107 normally rotates, the positioning arm member 103 retracts from the loading position H toward the horizontal portion 34 through the pinion gear portion 108 and the rack 106.

As illustrated in FIG. 4, the stopper member 104 is a square plate member that stands up or lies down at a tip portion of the positioning arm member 103. The stopper member 104 is coupled to the tip portion of the positioning arm member 103 with a pin (not illustrated) so as to stand up or lie down. The pin has the same configuration as the pin 99, and an axis of the pin is orthogonal to the longitudinal direction of the positioning arm member 103. The stopper member 104 is located next to the other fork 32 so as to come into contact with the load W whenever the other fork 32 supporting the load W advances. The stopper member 104 is inclined to lie down and, rearward, to stand up. When the stopper member 104 lies down, an upper end of the stopper member 104 is at the same level as the upper surface of the positioning arm member 103. When the stopper member 104 stands upright, the stopper member 104 is provided upright at the tip portion of the positioning arm member 103. When standing upright, the stopper member 104 is in contact with a restricting portion (not illustrated) disposed on the positioning arm member 103, so that it is impossible that the stopper member 104 is inclined rearward to lie down. The restricting portion (not illustrated) has the same configuration as the restricting portion 93A for the stopper member 94.

The urging member 105 is a member that applies urging force to the stopper member 104 such that the stopper member 104 stands up. In this embodiment, the stopper member 104 employs a tensile coil spring. Thus, the stopper member 104 stands upright at normal times by the urging force applied by the urging member 105. Furthermore, the stopper member 104 is inclined forward to lie down. This means that when the load drawing mechanism 70 draws the load W on the pair of forks 32, the stopper member 104 lies down. Thus, the stopper member 104 does not to hinder the drawing of the load W. When the load W moves toward the loading position H, the stopper member 104 is inclined to lie down by the load W running onto and getting across the stopper member 104. After the load W has passed across the stopper member 94, the stopper member 104 stands upright by the urging force applied by the urging member 105.

The load handling device 10 includes a controller 110 that is configured to control each part of the load handling device 10 (see FIG. 1). The controller 110 is not illustrated in the present embodiment. The controller 110 includes an arithmetic processing section, a storage section, and a communication section. The arithmetic processing section executes a program previously stored; the storage section stores data and the program; and the communication section communicates with a higher level system (not illustrated). The controller 110 receives, from the higher level system, information regarding the load W to be loaded, and controls the fork advancing/retracting mechanism 40, the fork distance adjusting mechanism 65, the load drawing mechanism 70, and the load positioning mechanism 90 in accordance with a size of the load W. The controller 110 is connected to the load detector 87 and other sensors (not illustrated) so as to control each part in response to the signals from the sensors including the load detector 87. Furthermore, in accordance with the size, weight, or a category of the load W, the controller 110 determines the loading position H where the load W is to be appropriately loaded.

Next, loading the load W by the load handling device 10 will be described. When the load W has been carried on the load conveyor 11 and reached the end 13 of the load conveyor 11, the side surface of the load W near the end 13 of the load conveyor 11 is positioned by the stopper member 13A. Next, the feeding mechanism 14 operates to feed the load W to the load handling device 10. The load W is fed in the direction orthogonal to the direction where the load W is carried on the load conveyor 11.

In the load handling device 10, the base platform 20 is set at a position in the direction orthogonal to the pair of forks 32 in such a manner that the pair of forks 32 opposes the supply position G; and the lifting unit 30 is set at a height such that the pair of forks 32 supports the load W fed from the load conveyor 11. Concurrently, in accordance with the information of the load W that the controller 110 has previously obtained, the distance between the pair of forks 32 is adjusted to the size of the load W. Thus, when the load W is fed from the load conveyor 11 the pair of forks 32 supports the bottom surface of the load W. The load W that has been fed is located on the pair of forks 32, closer to the load conveyor 11.

Next, the load drawing mechanism 70 operates to draw the load W to the predetermined position. More specifically, the fork distance adjusting mechanism 65 operates to cause the feeder belts 76 and 86 of the load drawing mechanism 70 to hold the load W therebetween. Then, the drive motors 73 and 83 operate to feed the feeder belts 76 and 86 holding the load W therebetween toward front ends of the pair of forks 32. The feeder belts 76 and 86 are fed to cause the load W to slide on the pair of forks 32 toward the tips of the pair of forks 32.

Figure 7A:
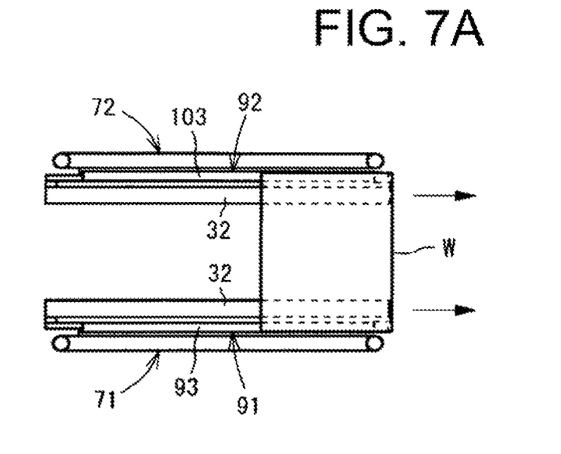
FIG. 7A is a plan view illustrating a state where the pair of forks support the load at a predetermined position in the load handling device according to the embodiment of the present disclosure.

When the load drawing mechanism 70 operates to cause the load W to slide on the pair of forks 32, the stopper members 94 and 104 of the load positioning mechanism 90 each of which stands upright are inclined forward to lie down by the load W sliding on the stopper members 94 and 104. When the load W is located on the stopper members 94 and 104, the stopper members 94 and 104 remain lying down. When a front end of the load W blocks the sensor beam L of the load detector 87, the drive motors 73 and 83 stop, thereby causing the load W to stop on the forks 32. Here, as illustrated in FIG. 7A, the front surface of the load W in the stop state on the forks 32 is aligned with the tips of the forks 32 in the front-to-rear direction of the load handling device 10.

Next, the base platform 20 moves on the pair of guide rails for the reciprocation 21 in accordance with the loading position H of the load W in the pallet 12 as a loading destination of the load W. Concurrently, the lifting unit 30 moves up and down in accordance with a height of a placement surface of the pallet 12. Positions of the pair of forks 32 in a direction orthogonal to a front-to-rear direction of the pallet 12 are determined by the movement of the base platform 20. The lifting unit 30 is set at a lifting position where a gap is provided between lower portions of the pair of forks 32 and the placement surface of the pallet 12. The gap causes a distance between the upper surfaces of the pair of forks 32 and the placement surface of the pallet 12. The distance is set to be a distance at which the load W is not damaged even when the load W is drawn from the pair of forks 32 that has supported the load W to be dropped on the placement surface of the pallet 12. The distance is also set in consideration that the load W is not largely out of position even when the load W is dropped on the placement surface of the pallet 12.

Figure 7B:
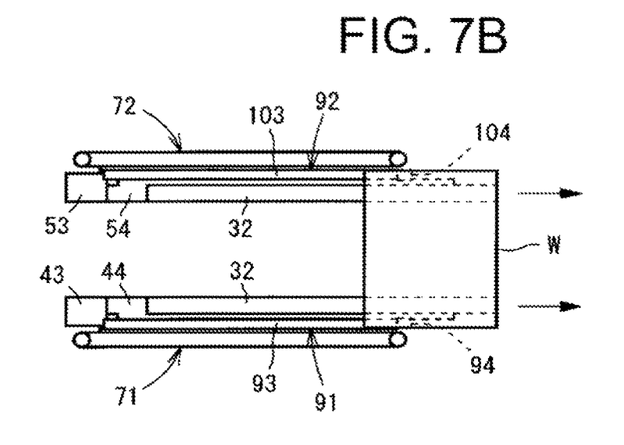
FIG. 7B is a plan view illustrating a state immediately after the pair of forks supporting the load advance.

Next, the fork advancing/retracting mechanism 40 operates. The drive motor 47 for the fork advancing/retracting part 41 normally rotates, and in synchronization with the drive motor 47, the drive motor 57 for the fork advancing/retracting part 42 reversely rotates, so that the pair of forks 32 advances in accordance with the loading position H of the load W in the pallet 12. As illustrated in FIG. 7B, the fork support arm members 44 and 54 advance and simultaneously, the pair of forks 32 advances. Thus, the load W advances toward the pallet 12 together with the forks 32. The drive motors 47 and 57 cause the forks 32 to advance to a position where the forks 32 reach the loading position H of the load W in the front-to-rear direction of the load handling device 10. While the pair of forks 32 advances, the load W runs onto and gets across the stopper members 94 and 104. After the load W has passed across the stopper members 94 and 104, the stopper members 94 and 104 respectively stand upright by the urging force applied by the urging members 95 and 105. After the load W has passed across the stopper members 94 and 104, and the pair of forks 32 have advanced to reach the loading position H of the load W, the drive motors 47 and 57 stop.

Figure 7C:
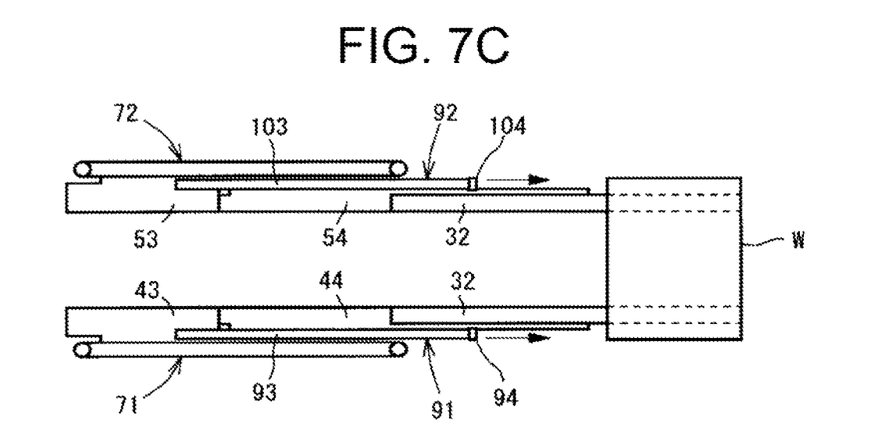
FIG. 7C is a plan view illustrating a state where the load supported by the pair f forks has reached the loading position.
Figure 8A:
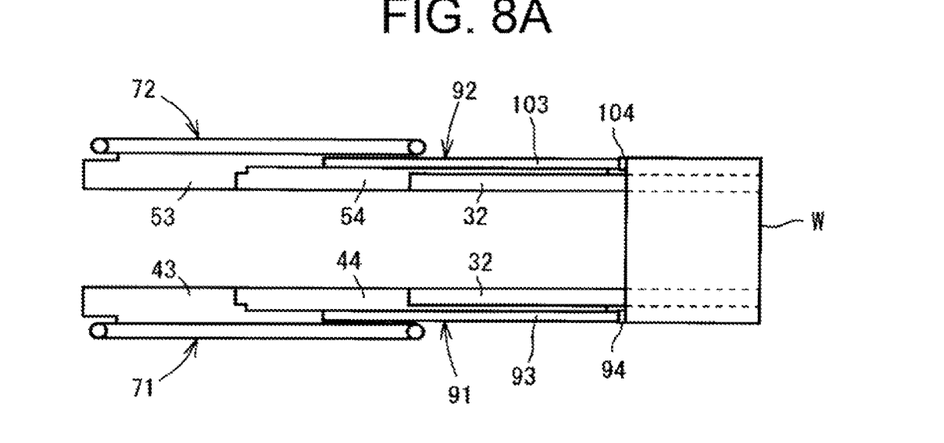
FIG. 8A is a plan view of a state where a pair of positioning arm members have advanced and stopped in the load handling device according to the embodiment of the present disclosure.

As illustrated in FIG. 7C, after the load W has passed across the stopper members 94 and 104, the load positioning mechanism 90 operates until when the pair of forks 32 reaches the loading position H to stop. More specifically, the drive motor 97 for the load positioning part 91 normally rotates, and in synchronization with the drive motor 97, the drive motor 107 for the load positioning part 92 reversely rotates. The drive motors 97 and 107 are respectively driven to cause the positioning arm members 93 and 103 to advance. The positioning arm members 93 and 103 advance in accordance with the loading position H of the load W. As illustrated in FIG. 8A, the positioning arm members 93 and 103 respectively stop at positions where the stopper members 94 and 104 come into contact with a rear surface of the load W or are in sufficient proximity of the rear surface of the load W.

Figure 8B:
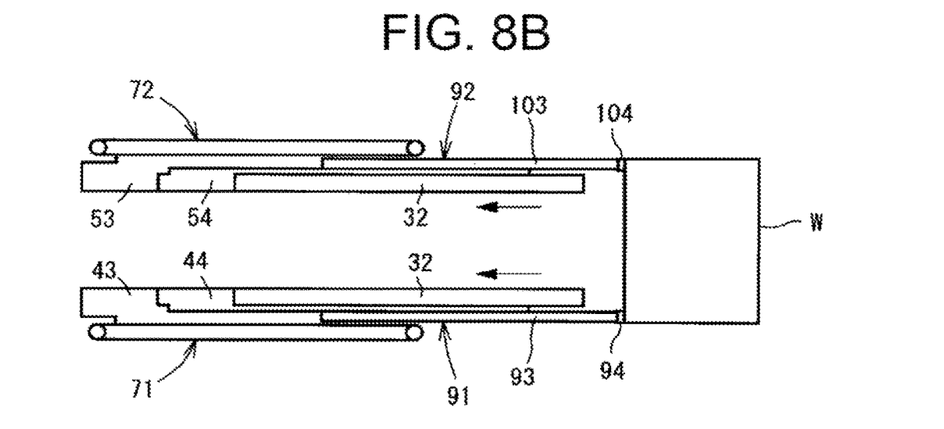
FIG. 8B is a plan view of a state where the pair of forks have retracted away from the load.

Next, the fork advancing/retracting mechanism 40 operates to cause the pair of forks 32 to retract. The drive motor 47 reversely rotates to cause the fork support arm member 44 to retract, and the drive motor 57 normally rotates to cause the fork support arm member 54 to retract, so that the pair of forks 32 retracts. When the forks 32 retract, the positioning arm members 93 and 103 do not move. In this state, the load W on the forks 32 is positioned by the stopper members 94 and 104, and does not retract together with the pair of forks 32. As a result, the load W slides relative to the forks 32. As illustrated in FIG. 8B, when the pair of forks 32 has moved away from the load W, the load W is dropped on the pallet 12 to be loaded at the loading position H planned.

Figure 8C:
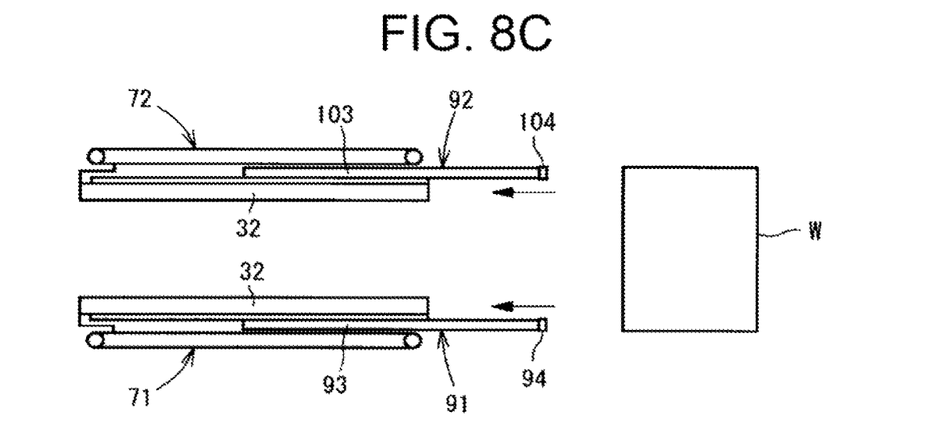
FIG. 8C is a plan view of a state where the pair of forks have retracted to original positions and the pair of positioning arm members retract.

Next, as illustrated in FIG. 8C, the load positioning mechanism 90 operates to cause the positioning arm members 93 and 103 to retract. More specifically, the drive motor 97 for the load positioning part 91 reversely rotates, and in synchronization with the drive motor 97, the drive motor 107 for the load positioning part 92 normally rotates. The drive motors 97 and 107 are respectively driven to cause the positioning arm members 93 and 103 to retract and return to original positions where the positioning arm members 93 and 103 were located before advancing. The pair of forks 32 has already returned to original positions where the pair of forks 32 was located before advancing. Then, the positioning arm members 93 and 103 are prepared to load a load W as a next load along with the pair of forks 32.

Figure 9:
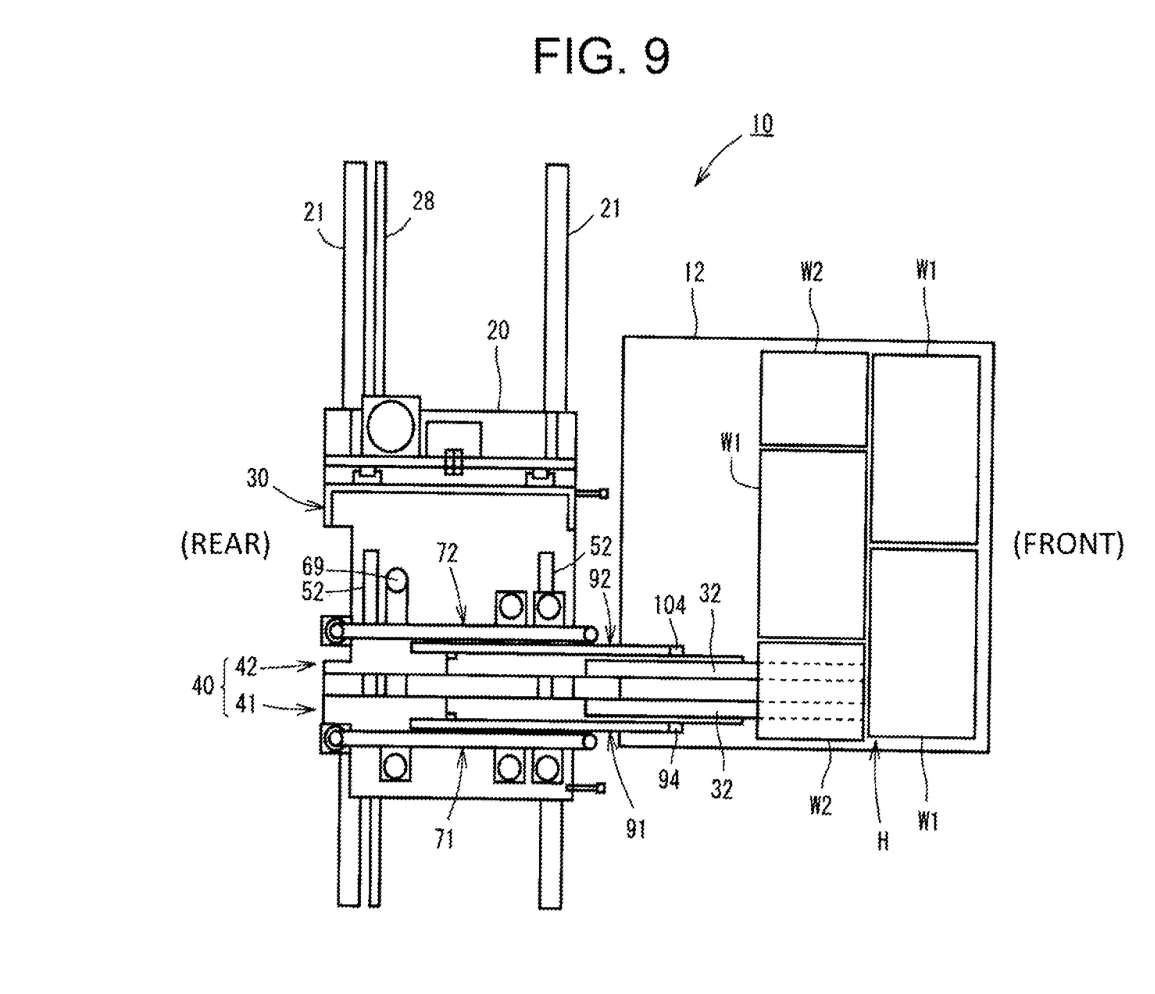
FIG. 9 is a plan view of the load handling device configured to load the loads of different sizes.

In this embodiment, the load handling device 10 loads loads of various types having different lengths and widths. As illustrated in FIG. 9, the load handling device 10 loads loads W1 and loads W2 of different sizes on the pallet 12 without having a substantial gap between the loads W. In front-to-rear directions of the loads W1 and W2, each of the loads W2 has a length equal to that of each of the loads W1; however, in width directions of the loads W1 and W2 orthogonal to the longitudinal directions, the load W2 has a length that is approximately half of a length of the load W1. In this embodiment, it is possible for the pair of forks 32 in the load handling device 10 to support the load W2.

In the load handling device 10, the pair of forks 32 supports the bottom surface of each of the loads W while positioned so as not to be out of the bottom surface of the respective loads W. With this configuration, as illustrated in FIG. 9, for example, when the pallet 12 has some space where the load W2 is to be located at an end of the pallet 12, it is possible to place the load W2 without having the substantial gap from the load W1 that has been previously loaded. Concurrently, the forks 32, the fork support arm member 44, the fork support arm member 54, the positioning arm member 93, the positioning arm member 103, the stopper member 94, and the stopper member 104 are positioned so as not to be out of the respective loads W in the direction orthogonal to the direction where they advance or retract.

Figure 10A:
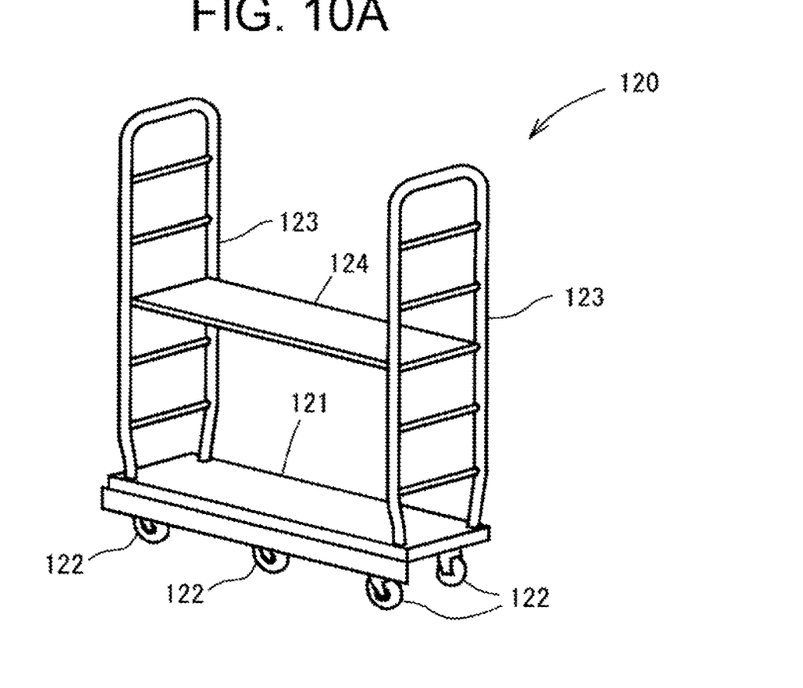
FIG. 10A is a perspective view of a stock cart.

In the load handling device 10, the pair of forks 32, the fork support arm member 44, the fork support arm member 54, the positioning arm member 93, the positioning arm member 103, the stopper member 94, and the stopper member 104 are positioned so as not to be out of the load W in the direction orthogonal to the direction where they advance or retract. With this configuration, even when the loads W are loaded on a stock cart 120 illustrated in FIG. 10A, it is possible to load the loads W without having a substantial gap between the loads W. The stock cart 120 includes a cart main body 121 that has a plurality of casters 122, frames 123 that are provided upright at opposite ends of the cart main body 121, and a shelf member 124 that is horizontally laid between the frames 123. When the cart main body 121 or the shelf member 124 has some space thereon, it is possible to further place the load W without interference of the pair of forks 32 or the like and the frames 123, and without having the substantial gap from the load W (not illustrated) that has been previously loaded.

Figure 10B:
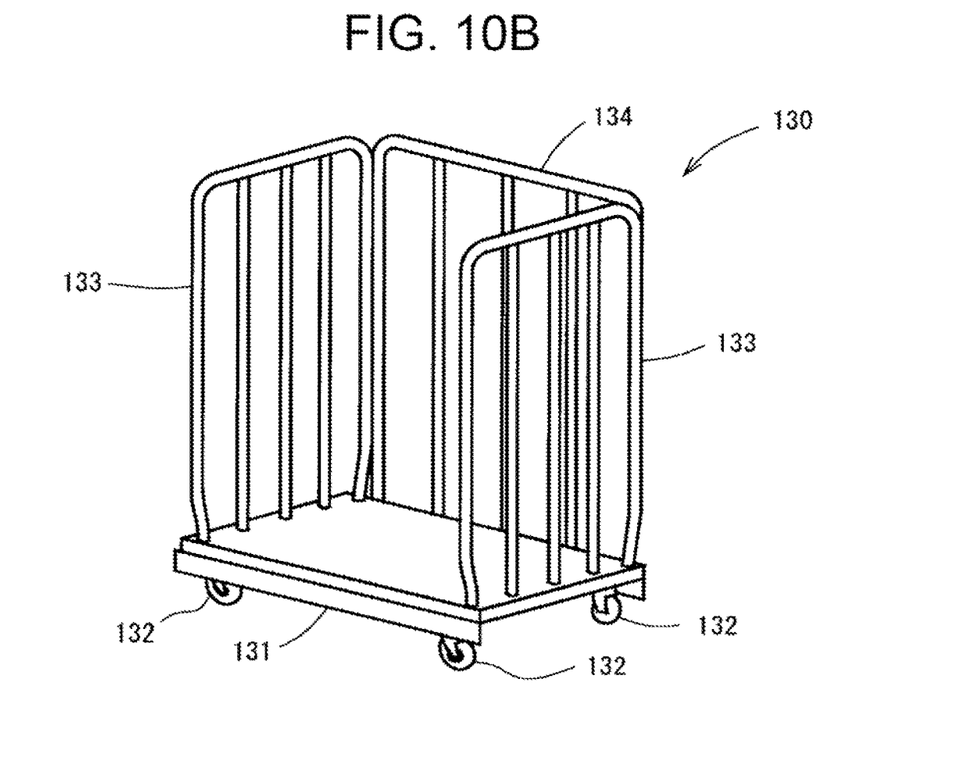
FIG. 10B is a perspective view of a cage cart.

Similarly to the stock cart 120, with the load handling device 10, it is possible to load the loads W without having a substantial gap between the loads W on a cage cart 130 illustrated in FIG. 10B. The cage cart 130 includes a cart main body 131 that has a plurality of casters 132, frames 133 that are provided upright at opposite ends of the cart main body 131, and a side frame 134 that are provided upright between the frames 133. When the cart main body 131 has some space thereon, it is possible to further place the load W without interference of the pair of forks 32 or the like and the frames 133 or the side frame 134, and without having the substantial gap from the load W (not illustrated) that has been previously loaded.

The load handling device 10 of the present embodiment has the following advantageous effects.

(1) The load handling device 10 is installed between the supply position G and the loading position H, and configured to load at the loading position H the load W that has been fed from the supply position G. The load handling device 10 includes the base platform 20, the lifting unit 30, the pair of forks 32, the fork distance adjusting mechanism 65, and the fork advancing/retracting mechanism 40. The lifting unit 30 is movable up and down relative to the base platform 20; the pair of forks 32 is disposed on the lifting unit 30 and configured to support a bottom surface of the load W that has been fed from the supply position G; the fork distance adjusting mechanism 65 is configured to adjust the distance between the forks 32 in accordance with a size of the load W; and the fork advancing/retracting mechanism 40 is configured to cause the pair of forks 32 to advance to or retract from the loading position H. With this configuration, when the pair of forks 32 supports the load W that has been fed from the load conveyor 11 at the supply position G, the fork distance adjusting mechanism 65 adjusts the distance between the forks 32 in accordance with the size of the load W. Then, the forks 32 support the bottom surface of the load W. The fork advancing/retracting mechanism 40 causes the forks 32 supporting the load W to advance and load the load W on the pallet 12 as the loading position H. The forks 32 support the bottom surface of the load W. Thus, even when loading the loads W of various types, it is possible to further load the load W without having a substantial gap from the load W that has been previously loaded.

(2) The load handling device 10 includes the reciprocating mechanism 19. The reciprocating mechanism 19 is configured to cause the pair of forks 32, the fork distance adjusting mechanism 65, and the fork advancing/retracting mechanism 40 on the base platform 20 to reciprocate horizontally in a direction intersecting the direction where the load W is fed in such a manner as to align the pair of forks 32, the fork distance adjusting mechanism 65, and the fork advancing/retracting mechanism 40 on the base platform 20 with the loading position H. With the reciprocating mechanism 19, the base platform 20 reciprocates horizontally in the direction intersecting the direction where the load W is fed in such a manner as to be aligned with the loading position H. With this configuration, it is possible to load the loads W without moving the pallet 12 as the loading position H, and without having the substantial gap from the load W that has been previously loaded. It is not required to move the pallet 12 as the loading position H, so that space for installing the load handling device 10 is saved.

(3) The load handling device 10 includes the load positioning mechanism 90. The load positioning mechanism 90 is configured to restrict the load W from moving back when the pair of forks 32 retracts from the loading position H, and configured to position the load W at the loading position H. The load positioning mechanism 90 includes the stopper members 94 and 104. The stopper members 94 and 104 are inclined to stand up or lie down relative to a supporting surface of a corresponding one of the pair of forks 32. The stopper members 94 and 104 are disposed at a position in which the stopper members 94 and 104 are inclined to lie down by the load W running onto and getting across the stopper members 94 and 104 when the forks 32 advance (when the load W moves in the direction where the load W is fed). After the load W has passed across the stopper members 94 and 104, the stopper members 94 and 104 stand upright. The load W is loaded from the forks 32 to the loading position H. Here, the stopper members 94 and 104 of the load positioning mechanism 90 restrict the load W from moving back when the forks 32 retract from the loading position H, and position the load W at the loading position H. When the forks 32 advance, the stopper members 94 and 104 of the load positioning mechanism 90 are inclined to lie down by the load W running onto and getting across the stopper members 94 and 104. After the load W has passed across the stopper members 94 and 104, the stopper members 94 and 104 stand upright. As a result, a configuration by which each of the stopper members 94 and 104 is prevented from interfering with the load W is not required.

Compared with a case where a pusher is used to load the load W, it is possible to save space for the load positioning mechanism 90.

(4) The load positioning mechanism 90 includes the positioning arm member 93, the positioning arm member 103, the urging member 95, and the urging member 105. The positioning arm members 93 and 103 respectively include the stopper members 94 and 104, and are configured to advance or retract in the direction where the load W is fed. The urging members 95 and 105 respectively apply urging force to the stopper members 94 and 104 by which the stopper members 94 and 104 is caused to stand upright. The stopper members 94 and 104 are respectively inclined to lie down by the load W running onto and getting across the stopper members 94 and 104 when the forks 32 advance (when the load W moves in the direction where the load W is fed). After the load W has passed across the stopper members 94 and 104, the stopper members 94 and 104 stand upright by the urging force applied by the urging members 95 and 105. The positioning arm members 93 and 103 advance or retract in the direction where the load W is fed, so that the stopper members 94 and 104 are positioned in accordance with the loading position H of the load W.

(5) The fork advancing/retracting mechanism 40 includes the fork support arm member 44, the fork support arm member 54, the advancing belt 45, the advancing belt 55, the retracting belt 46, and the retracting belt 56. The pair of fork support arm members 44 and 54 is disposed so as to advance or retract in the direction where the load W is fed, and configured to support the pair of forks 32 in such a manner that the forks 32 advance or retract. The advancing belts 45 and 55, together with the retracting belts 46 and 56, serve as the interlock members in the present disclosure. These interlock members interlock the pair of forks 32 with the pair of fork support arm members 44 and 54 that advances or retracts so as to cause the forks 32 to advance or retract. When the pair of fork support arm members 44 and 54 advances or retracts in the direction where the load W is fed, the advancing belts 45 and 55, together with the retracting belts 46 and 56, interlock the pair of forks 32 with the pair of fork support arm members 44 and 54 that advances or retracts so as to cause the forks 32 to advance and retract. With this configuration, the pair of forks 32 are caused to advance or retract in the direction where the load W is fed. Here, the fork support arm member 44 and a corresponding one of the pair of forks 32 (the one fork 32) extend and contract in the multi-stage manner relative to the fixed base member 43; and the fork support arm member 54 and a corresponding one of the pair of forks 32 (the other fork 32) extend and contract in the multi-stage manner relative to the movable base member 53. Accordingly, it is possible to save space for the fork advancing/retracting mechanism 40.

(6) The load handling device 10 includes the load drawing mechanism 70. The load drawing mechanism 70 is configured to draw the load W which has been fed from the supply position G onto the pair of forks 32 to the predetermined position. With the load drawing mechanism 70, the load W, which has been fed from the supply position G onto the pair of forks 32, is drawn to the predetermined position. Then, while on the pair of forks 32, the load W is positioned so as to be loaded at an appropriate position.

(7) The direction where the load drawing mechanism 70 draws the load W is the same as the direction where the fork advancing/retracting mechanism 40 causes the pair of forks 32 to advance or retract. Here, the direction where the load drawing mechanism 70 draws the load W is the same as the direction where the fork advancing/retracting mechanism 40 causes the pair of forks 32 to advance or retract, so that it is possible to reduce the distance where the load W moves between the supply position G and the loading position H. As a result, even when the space between the supply position G and the loading position H is restricted, it is possible to install the load handling device 10 and is thus possible to load the load W.

(8) The load handling device 10 includes the load detector 87. The load detector 87 is disposed at the end of the lifting unit 30 near the loading position H, and configured to detect the load W that has been drawn to the predetermined position. Thus, when the load detector 87 detects the load W, it is possible to determine whether the load W has been drawn to the predetermined position in the lifting unit 30.

(9) The stopper members 94 and 104 of the load positioning mechanism 90 are inclined to lie down when the stopper members 94 and 104 comes into contact with the load W sliding on the pair of forks 32. With this configuration, the load positioning mechanism 90 is not required to move the stopper members 94 and the stopper member 104 so that the stopper members 94 and 104 do not come into contact with the load W, and it is thus possible to save space for the load positioning mechanism 90. Furthermore, the stopper member 94 or the stopper member 104 do not move to prevent coming into contact with the load W. Accordingly, the load positioning mechanism 90 operates in a shorter period of time, leading to improved processing performance of the load handling device 10.

(10) The load handling device 10 includes the fork distance adjusting mechanism 65. Thus, it is possible that the pair of forks 32 supports the loads W of various types and in different sizes within a range where the distance between the pair of forks 32 is adjustable. With this configuration, it is possible to load the loads W of the various types at the loading position H without having a substantial gap between the loads W.

The present disclosure is not limited to the above-described embodiment, and may be appropriately modified within the gist of the present disclosure, for example, as follows.

In the foregoing embodiment, a base platform of a load handling device moves in accordance with a loading position, and a pallet does not move; however, the present disclosure is not limited thereto. For example, the base platform of the load handling device may be fixed, and the pallet as a loading position may reciprocate along the load handling device.

In the foregoing embodiment, each of stopper members of a load positioning mechanism is inclined to lie down by a load running onto the stopper member, wherein the load slides on a pair of forks; however, the present disclosure is not limited thereto. Each of the stopper members does not need to be inclined to lie down, and may move to a position where the stopper member does not come into contact with the load at the moment that the load is fed.

In the foregoing embodiment, a fork advancing/retracting mechanism includes a belt as an interlock member, but the interlock member is not limited to the belt. The interlock member may be, for example, a chain.

In the foregoing embodiment, each of the stopper members employs a tensile coil spring as an urging member, but the urging member is not limited to the tensile coil spring. The urging member may be a compression coil spring. When the compression coil spring is used, the corresponding stopper member that pivots around a pin as a fulcrum may be connected with a corresponding one of positioning arm members in such a manner that the compression coil spring is compressed when the corresponding stopper member is inclined to lie down. Furthermore, the urging member may be a torsion coil spring attached to the pin serving as the fulcrum. Each of the stopper members does not only use the urging member to pivot, but may also use an actuator, e.g., a motor or an air cylinder, to move in a top-to-bottom direction of the load handling device.

In the foregoing embodiment, the base platform reciprocates horizontally in a direction intersecting a direction where the load is fed; however, the present disclosure is not limited thereto. For example, the pair of forks, the fork advancing/retracting mechanism, and a fork distance adjusting mechanism may reciprocate on the base platform horizontally in the direction intersecting the direction where the load is fed so as to be aligned with the loading position.

In the foregoing embodiment, the fork distance adjusting mechanism includes a belt and a pulley, but the present disclosure is not limited thereto. For example, the fork distance adjusting mechanism may alternatively include a rack and a pinion gear. Furthermore, a reciprocating mechanism or a lifting mechanism may include the belt and the pulley, or alternatively may include the rack and the pinion gear.

In the foregoing embodiment, the load detector is disposed at the end of the lifting unit near the loading position H, but the present disclosure is not limited thereto. The load detector may be disposed at an end of the base platform near the loading position H.

What is claimed is:

1. A load handling device that is installed between a supply position where a load is fed and a loading position where the load is loaded, and configured to load at the loading position the load that has been fed from the supply position, the load handling device comprising:
    a base platform;
    a lifting unit that is movable up and down relative to the base platform;
    a pair of forks that is disposed on the lifting unit and configured to support a bottom surface of the load that has been fed from the supply position;
    a fork distance adjusting mechanism that is configured to adjust a distance between the pair of forks in accordance with a size of the load;
    a fork advancing/retracting mechanism that is configured to cause the pair of forks to advance to or retract from the loading position, wherein the pair of forks is configured to support the bottom surface of the load to advance the load to a position where the pair of forks reaches the loading position of the load; and
    a load positioning mechanism that is configured to restrict the load from moving back when the pair of forks retracts from the loading position, and configured to position the load at the loading position, wherein
    the load positioning mechanism includes a stopper member that is configured to: (i) incline forward to lie down relative to a supporting surface of each of the pair of forks when the load runs onto and moves across the stopper member as the load moves in the direction toward the loading position, and (ii) incline rearward to stand up relative to the supporting surface of each of the pair of forks after the load has passed across the stopper member.

2. The load handling device according to claim 1, further comprising a reciprocating mechanism that is configured to cause the pair of forks, the fork distance adjusting mechanism, and the fork advancing/retracting mechanism to reciprocate horizontally in a direction intersecting a direction where the load is fed in such a manner as to align the pair of forks, the fork space adjusting mechanism, and the fork advancing/retracting mechanism with the loading position.

3. The load handling device according to claim 1, wherein the load positioning mechanism includes:
    a positioning arm member that is configured to advance or retract in the direction where the load is fed, and includes the stopper member; and
    an urging member configured to apply an urging force to the stopper member by which the stopper member is caused to stand upright after the load has passed across the stopper member.

4. The load handling device according to claim 1, wherein the fork advancing/retracting mechanism includes:
    a pair of fork support arm members that is disposed so as to advance or retract in the direction where the load is fed, and configured to support the pair of forks in such a manner that the forks advance or retract; and
    interlock members that interlock the pair of forks with the pair of fork support arm members that advance or retract so as to cause the pair of forks to advance or retract.

5. The load handling device according to claim 1, further comprising a load drawing mechanism that is configured to draw the load which has been fed from the supply position onto the pair of forks to a predetermined position.

6. The load handling device according to claim 5, wherein a direction where the load drawing mechanism draws the load is the same as a direction where the fork advancing/retracting mechanism causes the pair of forks to advance or retract.

7. The load handling device according to claim 5, further comprising a load detector that is disposed at an end of the base platform near the loading position or at an end of the lifting unit near the loading position, and configured to detect the load that has been drawn to the predetermined position.

* * * * *